RADIO RECEIVER IMPULSE NOISE BLANKING CIRCUIT
Filed Sept. 19, 1961
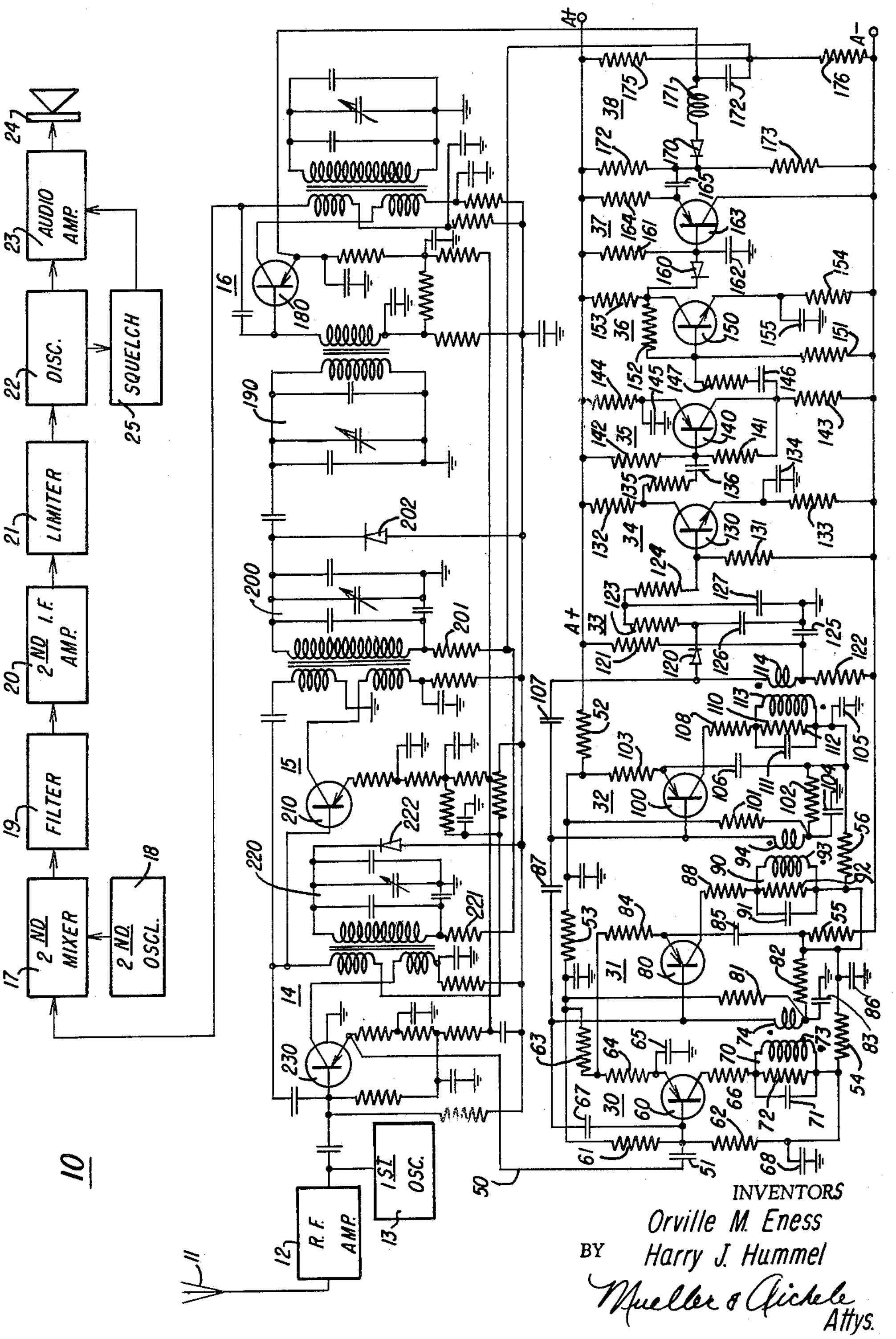
INVENTORS
Orville M. Eness
Harry J. Hummel
BY
Mueller & Aichele
Attys.

3,191,123

RADIO RECEIVER IMPULSE NOISE BLANKING CIRCUIT

Orville M. Eness, Norridge, and Harry J. Hummel, West Chicago, Ill., assignor to Motorola, Inc., Chicago, Ill., a corporation of Illinois Filed Sept. 19, 1961, Ser. No. 139,176
10 Claims. (Cl. 325—478)

This invention relates to blanking circuits in general and more particularly to an improved impulse noise blanking circuit for use in radio communications receivers.

It is well known that impulse noise disturbances superimposed upon a carrier wave signal can severely impair the translation of that carrier signal within a radio receiver. The problem is particularly true in mobile communications equipment which is subjected to ignition pulse interference, lightning flashes and the like. Such high impulse energy on being coupled to the highly selective communications receiver appears as undesirable audio output. Various systems have been incorporated to eliminate the effects of such impulse disturbances. One such system is described and claimed in Patent No. 2,901,601, issued to Roy A. Richardson and Jona Cohn on August 25, 1959, and assigned to the assignee of the present invention. This system detects noise pulses in an early stage of the receiver such as the high intermediate frequency portion and removes the effects of the noise pulses by interrupting the signal conduction at an arbitrary point preceding the relatively high gain portion of the receiver.

This invention is directed to an improvement in the system of the prior patent, and which is effective where there is an extremely heavy concentration or burst of impulse noise energy in removing the noise disturbances before they reach the highly selective band pass filter of the receiver. The rate of blanking action is primarily a function of the decay time of the tuned circuits associated with and preceding the stage being periodically blanked or interrupted. The blanking pulse so applied must necessarily exceed the duration of the decay time of such tuned circuits, but the blanking pulses must be spaced so that the desired signal gets through. This presents a problem when a burst of noise energy is encountered. Further, it is desirable that a provision be included to shape the applied blanking pulse such that energy at the signal frequency is not introduced as spurious components in the receiver channel.

It is therefore an object of the present invention to provide an improved impulse noise blanking circuit for a radio receiver which has a minimum of adverse effect on the characteristics of the receiver performance.

Another object of the invention is to provide an improved fast acting impulse noise blanking circuit for a radio receiver wherein blanking pulses may be generated to blank or interrupt a receiver stage and wherein the blanking pulses so generated may be shorter in duration than the decay time of the tuned circuit associated with the stage being blanked.

Another object is to provide an impulse noise blanking circuit wherein generated blanking pulses are pre-shaped before application to a receiver stage to insure proper blanking action and also that high frequency energy at the signal frequency is removed from the blanking pulses to prevent the injection of spurious components within the receiver channel.

A feature of the present invention is the provision of a radio receiver with an impulse noise blanking circuit which includes pulse detection and modifying circuits for generating blanking pulses to interrupt a receiver stage during the occurrence of impulse noise disturbances and wherein dissipation diodes are included in shunt with the tuned circuits preceding the blanked stage and operative in response to such blanking pulses whereby energy stored therein is effectively dissipated to increase the permissible rate of blanking action of the impulse noise blanking circuit.

Another feature is the provision of such an impulse noise blanking circuit which includes a diode gate to reject all low level signals below a predetermined level of amplitude to improve the protection for the receiver from intermodulation components.

Still another feature of the invention is the provision of such an impulse noise blanking circuit which includes a pulse shaping coil to pre-shape the generated blanking pulses before application to the receiver stage being blanked to insure that high frequency energy at the signal frequency is removed, thereby preventing the injection in the receiver of spurious components.

The single figure of the drawing shows a partial block and schematic diagram of a receiver incorporating the present invention.

In practicing the invention, a radio communications receiver is provided with an impulse noise blanking circuit which detects the noise disturbances that may be superimposed upon a receiver carrier signal and wherein blanking pulses are generated in response thereto to cancel the disturbances at an intermediate point in the radio receiver preceding the relatively high gain portion. Impulse noise disturbances are amplified and detected as noise pulses which are amplified further and filtered to remove spurious signals within the pass band range of the receiver. The detected and filtered noise pulses are then lengthened a predetermined amount by a pulse stretching network and applied to a diode gate which rejects all low level signal components below a predetermined level of amplitude, thereby improving the protection for the receiver from intermodulation products. The noise pulses so passed are pre-shaped by a shaping coil before application to a radio receiver stage, to insure the removal of inherent high frequency energy at the signal frequency which might inject spurious signal components within the receiver. In addition, dissipation diodes are included in shunt across the tuned circuits preceding the stage to be blanked, and are rendered conductive by a portion of the blanking pulse to dissipate the stored energy therein. Due to the shorter blanking pulses now possible, the rate of blanking action may be substantially increased without removing such a large part of the carrier signal that the reproduced signal is adversely affected thereby.

In the single figure there is illustrated a frequency modulation communications receiver 10 of the double conversion type. It is to be understood, however, that the invention is not limited to use in any particular receiver.

Signals received by antenna 11 are fed to radio frequency amplifier stage 12. From the output of stage 12, the desired signal is fed to first mixer stage 14 wherein the signal is converted to an intermediate frequency by a fixed signal from oscillator 13. The converted signal is coupled to, and amplified in, first intermediate frequency amplifier stage 15 and amplified further in intermediate frequency amplifier stage 16. The output of stage 16 is connected to second mixer stage 17 and the signal is converted to a still lower intermediate frequency by a fixed signal from second oscillator stage 18. The converted signal is applied through the highly selective filter 19 to the second intermediate frequency amplifier stage 20. The amplified signal is fed to limiter stage 21, the output of which is coupled to discriminator 22 which demodulates the intelligence portion of the carrier signal. The intelligence signal is amplified to a desired level by audio amplifier stage 23 and rendered audible by loudspeaker 24. Squelch action is provided by stage 25 operating in a well known manner.

For the blanker channel, a connection is made at the emitter electrode of transistor 230 in first mixer stage 14, through lead 50 and coupling capacitor 51, to the input base electrode of amplifier stage 30. Bias for transistor 60 is obtained from base bleeder network formed by resistors 61 and 62. Voltage divider networks consisting of resistors 52 and 53 and resistors 54, 55 and 56 provide a decoupling action for the A+ A− power source. Resistors 63 and 64 form the emitter bias for transistor 60 with the value of resistor 63 being chosen to provide the desired gain characteristics. Operating voltage is supplied through resistor 72 and coil 73 of tuned circuit 70 and resistor 66 to the collector electrode. Resistor 66 in the collector electrode signal path further limits the reverse current on excessive strong signals to prevent relaxation of the amplifier stage. Bypass is effected by capacitors 65 and 68. Neutralization is provided in a well known manner by capacitor 67 connected between the secondary winding 74 and the base electrode. The output signal is developed across tuned circuit 70 formed by capacitor 71, resistor 72 and coil 73 with secondary winding 74 forming the input to amplifier stage 31.

In stage 31, bias for transistor 80 is obtained from the base bleeder network formed by resistors 81 and 82. Resistor 84 is the emitter resistor with operating voltage being supplied to the collector electrode through resistor 92 and coil 93 of tuned circuit 90 and resistor 88. Bypass is effected by capacitors 83, 85 and 86. Stage 31 is neutralized by capacitor 87 with resistor 88 preventing relaxation by limiting reverse current. The output signal is developed across tuned circuit 90, with secondary winding 94 forming the input to amplifier stage 32. Bias for transistor 100 of stage 32 is obtained from a base bleeder network formed by resistors 101 and 102. Resistor 103 is the emitter resistor and operating voltage is supplied to the collector electrode through resistor 112 and coil 113 of tuned circuit 110 and resistor 108. Neutralization is provided by capacitor 107 and stabilized by resistor 108. Bypass is effected by capacitors 104, 105 and 106. The output signal is developed across tuned circuit 110 with secondary winding 114 forming the input to the pulse detector stage 33.

Detector stage 33 includes diode 120 functioning as an amplitude detector. Bias is supplied through coil 114 from the bleeder network formed by resistors 121 and 122. The resistance-capacitance network consisting of resistors 123 and 124 and capacitors 125, 126 and 127 forms a filter network.

The output of pulse detector stages 33 is coupled to the input of pulse amplifier stage 34. Bias for transistor 130 of stage 34 is supplied by resistor 131, resistor 133 is the emitter resistor and resistor 132 supplies the operating voltage with capacitor 134 providing the necessary bypass. The output signal is coupled through resistor 135 and coupling capacitor 136 to the input of pulse amplifier stage 35. In this stage, bias for transistor 140 is obtained from the base bleeder network formed by resistors 141, 142 and 143. Operating voltage for transistor 140 is supplied to the collector through resistor 143. Resistor 144 is the emitter resistor which is bypassed by capacitor 145. The output signal is coupled through coupling capacitor 146 and resistor 147 to the input of pulse amplifier stage 36 which includes transistor 150. Bias for transistor 150 is obtained from the base bleeder network formed by resistors 151 and 152 and operating voltage is supplied through resistor 153. Capacitor 155 bypasses the emitter resistor 154.

The output signal from stage 36 is coupled to a pulse stretching network 37 consisting of diode 160, resistor 161, capacitor 162 and transistor 163. Bias is supplied to transistor 163 by resistor 161 with resistor 164 forming the emitter load, the output signal from the emitter electrode is applied through coupling capacitor 165 to a pulse shaping network 38 consisting of a diode gate 170 in series with a shaping coil 171. Diode 170 is biased by a bleeder network formed by resistors 172 and 173.

The output of pulse shaping network 38 is coupled to the emitter electrode of transistor 180 in the receiver intermediate frequency amplifier stage 16. A portion of the signal is coupled through capacitor 172 and through resistors 221 and 201 to tuned circuits 220 and 200 respectively. Tuned circuit 200 forms the output from intermediate frequency amplifier stage 15, and tuned circuit 220 forms the output from mixer stage 14. Diodes 222 and 202 are included in shunt with tuned circuits 220 and 200 and are normally back biased by being returned to the negative side of the power source.

In operation, signals selected and amplified in radio frequency amplifier stage 12 are converted to an intermediate frequency such as 5.5 megacycles when applied to first mixer stage 14. The converted 5.5 megacycles are amplified in first intermediate frequency amplifier stages 15 and 16 respectively. The signal appearing at the emitter electrode of transistor 180 in stage 16 will be delayed in time relation with respect to the signal appearing at the emitter electrode of transistor 230 in mixer stage 14. This results from the delaying action of tuned circuits 190, 200 and 220.

In the blanker channel, signals at the 5.5 megacycle conversion frequency are coupled from the emitter electrode of transistor 230 in stage 14 to the input base electrode of the transistor 60 in amplifier stage 30, wherein such signals are amplified and applied to amplifier stage 31 and 32 respectively for further amplification. Amplifier stages 30, 31 and 32 are made operative at the 5.5 megacycle first intermediate conversion frequency by proper adjustment of tuned circuits 70, 90 and 110.

Output signals from stage 32 are applied to the amplitude pulse detector 33 where noise disturbances above the carrier signal are detected by diode 120. Filter network consisting of resistors 123 and 124 and capacitor 125, 126 and 127 operates to remove signals at the 5.5 megacycle intermediate frequency. The detected pulses are applied to pulse amplifier stage 34 and are further amplified in pulse amplifier stages 35 and 36.

It is to be emphasized that pulse amplifier stages 34, 35 and 36 further include means for rejecting spurious signal components falling within the pass band range of the receiver. Specifically, the associated components in stages 34, 35 and 36 combine with the input impedances of transistors 130 and 140 and 150 to form a filter network having a high pass characteristic whereby frequencies on the order of 100 kilocycles and below are effectively reduced. The filtering action improves the protection for the receiver from undesirable intermodulation and related spurious components. It will be realized, however, that this filtering action will also result in a foreshortening of the detected noise pulses.

The output of pulse amplifier stage 36 is coupled to pulse stretching network 37 wherein the foreshortened noise pulses are lengthened a predetermined amount. The filtered pulses are coupled through diode 160 and charge capacitor 162 to a proportional value. The RC time constant of resistor 161 and capacitor 162 is such as to provide an output from transistor 163 in the form of a sawtooth wave signal. The pulses so lengthened are coupled to the pulse forming network 38 which includes a diode gate 170 in series with a pulse shaping coil 171. Diode 170 is biased to pass signals only above a predetermined level of amplification to eliminate, or "strip off" all low level signals that may include intermodulation products as well as random or white noise generated within the blanking channel. The level at which noise pulses are passed through diode gate 170 is determined by the bias point as obtained from the junction of resistors 172 and 173. Coil 171 shapes or rounds out the relative sharp edges of the pulses passed by diode 170 so as to insure high frequency energy at the 5.5 megacycle conversion frequency is thereby removed from the blanking pulses.

The gated and shaped blanking pulses are thus applied to the emitter electrode of transistor 180 in the receiver intermediate frequency amplifier stage 16 whereby the stage is disabled during the application of each pulse thereto. Further, the blanking pulse is applied to the emitter electrode of transistor 180 at a time sequence coinciding with the appearance of impulse noise disturbances at its base electrode. The delay encountered in the blanker channel through stages 30–38 approximates the delay in the receiver channel through transistors 180, 210 and 230 and tuned circuits 190, 200 and 220.

As previously mentioned, diodes 222 and 202 in shunt with tuned circuits 220 and 200 respectively are normally biased non-conductive. On the generation of a pulse by the blanking circuit, however, a portion of the blanking pulse is coupled to these tuned circuits through capacitor 172 and resistors 221 and 201. The presence of a blanking pulse renders diode 222 and 202 conductive to rapidly dissipate the stored energy therein. This action effectively permits the utilization of blanking pulses of substantially shorter duration than would otherwise be obtained. Without such diodes, the decay time of tuned circuits 220 and 200 would be of the order of 60 microseconds as determined by selectively. This requires the use of blanking pulses of at least the same time duration. By incorporating diodes 222 and 202, the stored energy in tuned circuits 220 and 200 may be effectively dissipated in approximately 5 microseconds thereby permitting the use of blanking pulses having a time duration of approximately 25–30 microseconds, or on the order of one-half the previous requirements. This action therefore permits a substantially higher rate of blanking action which improves the ability of the blanking circuit to eliminate the effects of heavy concentrations or bursts of impulse noise energy from the carrier signal translated in the receiver.

Thus, it can be seen that the present invention provides an improved impulse noise blanking circuit for a radio communication receiver which includes a method of reducing the required time duration of the blanking pulses. This permits increasing the rate of blanking without materially increasing the degree of usable signal so eliminated by the blanking action which determines to a large degree the intelligibility of the translated signal. Spurious signals and low level intermodulation products are prevented from entering the receiver channel by way of the blanking channel by a diode gate and pulse shaping network.

We claim:

1. An impulse noise blanking circuit for use in a radio receiver having a first portion for translating a desired signal which may be accompanied by impulse noise disturbances, a second portion for repeating the desired signal, and circuit means for applying a signal from the first portion to the second portion with the signal so applied being delayed, and wherein the second portion is adapted to be interrupted by the application of blanking pulses thereto, said impulse noise blanking circuit including in combination, amplifying means connected to the first receiver portion, pulse detection means connected to said amplifying means for deriving noise pulses therefrom, pulse forming means connected to said pulse detection means for producing blanking pulses of predetermined amplitude and time duration, said pulse forming means including pulse amplifying means, filter means for reducing spurious components within the pass band range of the receiver, pulse lengthening means, gate means for passing pulses only above a predetermined level of amplitude, switch means adapted to be operated by a blanking pulse connected to the circuit means preceding the receiver second portion, and coupling means for applying said blanking pulses to said switch means and to the second receiver portion, whereby said switch means acts to dissipate the energy stored in the circuit means and the receiver second portion is disabled for the duration of the blanking pulse applied thereto.

2. In a carrier wave receiver having a first portion for translating a desired signal which may be accompanied by impulse noise disturbances, a second portion for repeating the desired signal, and circuit means for applying a signal from the first portion to the second portion with the signal so applied being delayed, and wherein the second portion is adapted to be interrupted by the application of blanking pulses thereto, an impulse noise blanking circuit including amplifying means connected to the first receiver portion, pulse detection means connected to said amplifying means for deriving noise pulses therefrom, pulse forming means connected to said pulse detection means for producing blanking pulses of predetermined amplitude and time duration, said pulse forming means having amplifying means including means for filtering out spurious signal components within the pass band range of the receiver and pulse modifying means including gating means and pulse stretching means whereby only those pulses above the predetermined level of amplitude are passed therethrough and lengthened to a desired time duration, diode means connected in shunt with the circuit means preceding the receiver second portion, and coupling means for applying said blanking pulses to said diode means and to the second receiver portion, whereby said diode means conducts to dissipate the energy stored in the circuit means and the receiver second portion is disabled for the duration of the blanking pulse applied thereto.

3. A carrier wave receiver including in combination, a first carrier wave amplifier stage for translating a desired signal which may be accompanied by impulse noise disturbances, a second carrier wave amplifier stage for repeating the signal and which is adapted to be interrupted by the application of blanking pulses thereto, circuit means for applying the signal from said first carrier wave amplifier stage to said second carrier wave amplifier stage with the signal so applied being delayed, and an impulse noise blanking circuit including pulse detection means coupled to said first amplifier stage for deriving noise pulses, pulse modifying means coupled to said pulse detection means for forming blanking pulses, said pulse modifying means including pulse amplifying means having filter means for reducing signal components within the pass band range of the receiver, means for shaping said filtered pulses to a predetermined time duration and amplitude, diode means connected in shunt with said circuit means and normally biased non-conductive, and coupling means for applying a portion of said formed blanking pulses from said pulse modifying means to said diode means and to said second amplifier stage whereby said diode means is rendered conductive to dissipate the stored energy in the circuit means and said second amplifier stage is disabled for the duration of the applied blanking pulse.

4. A frequency modulation receiver including in combination, a first portion for translating a desired signal which may be accompanied by impulse noise disturbances, tuned circuit means, a second portion coupled to said first portion by said tuned circuit means and which is adapted to be interrupted by the application of blanking pulses thereto, and a noise blanking circuit including amplifying means coupled to said receiver first portion, pulse detection means connected to said amplifying means for deriving noise pulses therefrom, pulse amplifying means connected to said pulse detection means and including filter means for reducing undesired signal components within the pass band range of the receiver whereby said derived noise pulses are fore-shortened in time duration, pulse forming means connected to said pulse amplifying means and including pulse lengthening means for stretching said detected and filtered pulses a predetermined amount, gating means for rejecting low level signals below a predetermined level of amplitude and pulse shaping means to form blanking pulses therefrom, diode means connected in shunt with said tuned circuit means and normally biased non-conductive, and means for applying said blanking pulses to said diode means and to said receiver second portion, whereby said diode means is rendered conductive to dissipate stored energy in said tuned circuit means and said second receiver portion is interrupted for the duration of an applied blanking pulse thereto.

5. In a frequency modulation receiver having a first portion including output circuit means for translating a desired carrier wave signal which may be accompanied by impulse noise disturbances, and a second portion including input circuit means for repeating the desired signal, and in which the second receiver portion is adapted to be interrupted by the application of blanking pulses thereto, a noise blanking circuit including amplifying means coupled to the first receiver portion, pulse detection means connected to said amplifying means for deriving noise pulses therefrom, pulse amplifying means connected to said pulse detection means and including means for reducing undesired signal components within the pass band range of the receiver whereby said derived noise pulses are foreshortened in time duration, pulse lengthening means connected to said pulse amplifying means for stretching said foreshortened pulses a predetermined amount, pulse forming means coupled to said pulse lengthening means and including gating means for rejecting signal components below a predetermined level of amplitude and pulse shaping means for forming blanking pulses therefrom, a first diode connected in shunt with said output circuit means of the receiver first portion and a second diode connected in shunt with said input circuit means of the receiver second portion, said diodes being normally biased non-conductive, and means for applying said blanking pulses to said diodes and to the receiver second portion whereby said diodes are rendered conductive to dissipate the stored energy in the input and output circuit means and the receiver second portion is interrupted for the duration of an applied blanking pulse.

6. In a frequency modulation receiver having a first portion including output circuit means for translating a desired signal which may be accompanied by large amplitude impulse noise, and a second portion including input circuit means coupled to the first receiver portion for repeating the desired signal, and wherein the second receiver portion is adapted to be interrupted by the application of blanking pulses thereto, an impulse noise blanking circuit including in combination, pulse deriving means connected to the receiver first portion, pulse modifying means coupled to said pulse deriving means, said pulse modifying means including pulse amplifying means having filter means for reducing undesired signal components falling within the pass band range of the receiver, pulse lengthening means for stretching said filtered pulses to a predetermined time duration, and a first diode and a pulse shaping coil connected in series and coupled to the receiver second portion to interrupt the same for the duration of an applied blanking pulse, said first diode passing signals above a predetermined level of amplitude only and said pulse shaping coil removing signal energy at the signal frequency from said blanking pulses, a second diode connected in shunt with the output circuit means of the receiver first portion, a third diode connected in shunt with the input circuit means of the receiver second portion, said diodes including means for normally biasing the same non-conductive, and coupling means for applying a portion of said blanking pulse to said diodes whereby the energy stored in the input and output circuit means are rapidly dissipated to permit the use of blanking pulses of short duration for an increase in the rate of blanking action.

7. An impulse noise blanking circuit for use in a frequency modulation receiver having a first portion including output circuit means for translating a desired carrier signal which may be accompanied by large amplitude impulse noise, and a second portion including input circuit means coupled to the first receiver portion for repeating the desired signal, and wherein the second receiver portion is adapted to be interrupted by the application of blanking pulses thereto; said impulse noise blanking circuit including in combination, first transistor amplifier means coupled to the receiver first portion, detector means connected to said amplifying means for detecting noise pulses above the carrier signal level, pulse modifying means coupled to said detector means and including second transistor amplifier means having means for filtering said detected noise pulses such that undesirable signal components falling within the pass band range of the receiver are effectively reduced, pulse lengthening means coupled to said second amplifier means for stretching said filtered pulses to a predetermined time duration and including a resistance-capacitance network, and pulse gating means including a diode for rejecting pulses in said modifying means falling below a predetermined amplitude, and means for applying pulses from said pulse modifying means to the receiver second portion to interrupt the same for the duration of an applied blanking pulse.

8. An impulse noise blanking circuit for use in a radio receiver having a first portion for translating a desired signal which may be accompanied by impulse noise disturbances, and a second portion following the first portion for repeating the desired signal and including a conducting path for the desired signal having a plurality of successive selective stages which store energy, said impulse noise blanking circuit including in combination, means connected to the first receiver portion including pulse detection means for deriving noise pulses from the received signal, pulse forming means connected to said pulse detection means for producing blanking pulses of predetermined amplitude and time duration, switch means for connection to the plurality of selective stages for shunting the same and interrupting the conduction of signals thereby, and means coupling said pulse forming means to said switch means for applying said blanking pulses thereto to interrupt the receiver second portion for the duration of a noise disturbance therein, said switch means acting to dissipate energy stored in the selective stages to thereby reduce the time during which the effect of the noise disturbance remains in the receiver.

9. An impulse noise blanking circuit for use in a radio receiver having a first portion for translating a desired signal which may be accompanied by impulse noise disturbances, and a second portion following the first portion for repeating the desired signal and including a conducting path for the desired signal having a plurality of successive stages, said impulse noise blanking circuit including in combination, means connected to the first receiver portion including pulse detection means for deriving noise pulses from the received signal, pulse forming means connected to said pulse detection means for producing blanking pulses of predetermined amplitude and time duration, said pulse forming means including pulse amplifying means, filter means for reducing spurious components within the pass band range of the receiver, pulse lengthening means, and gate means for passing pulses only above a predetermined level of amplitude, control means connected to the plurality of stages and cooperating therewith for interrupting the same, and means coupling said pulse forming means to said control means for applying said blanking pulses thereto to interrupt the receiver second portion for the duration of a noise disturbance therein, said control means acting to dissipate energy stored in at least one of the stages to thereby reduce the time during which the effect of the noise disturbance remains in the receiver.

10. A frequency modulation receiver including in combination, a first carrier frequency portion for translating a received modulated signal which may be accompanied by impulse noise disturbances, conducting means for the modulated signal coupled to said first portion, said conducting means having a plurality of circuit portions for translating the modulated signal and noise disturbances and acting to delay the same, at least one of said circuit portions including a transistor, an impulse noise blanking circuit including pulse detection means connected to said first receiver portion for deriving noise pulses from the received signal, pulse forming means connected to said pulse detection means for producing blanking pulses of predetermined amplitude and time duration, said pulse forming means including pulse amplifying means, filter means for reducing spurious components within the pass band range of the reeciver, and pulse output means for producing blanking pulses of said predetermined time duration in response to detected noise pulses above a predetermined level of amplitude, and control means connected to a plurality of said circuit portions including said one circuit portion which includes a transistor and coupling said pulse forming means thereto for applying said blanking pulses to said circuit portions, said control means and said circuit portions cooperating to interrupt the signal and noise disturbances in said circuit portions of said conducting means for the duration of an impulse noise disturbance.

References Cited by the Examiner

UNITED STATES PATENTS

| | | | |
|---|---|---|---|
| 2,657,318 | 10/53 | Rack | 307—885 |
| 2,901,601 | 8/59 | Richard et al. | 325—474 |
| 3,014,127 | 12/61 | Vlasak | 325—478 |

DAVID G. REDINBAUGH, *Primary Examiner.*